June 5, 1951 — G. HAUGAARD ET AL — 2,555,487
CHROMATOGRAPHIC PROCESS AND APPARATUS
Filed Feb. 27, 1948 — 3 Sheets-Sheet 1
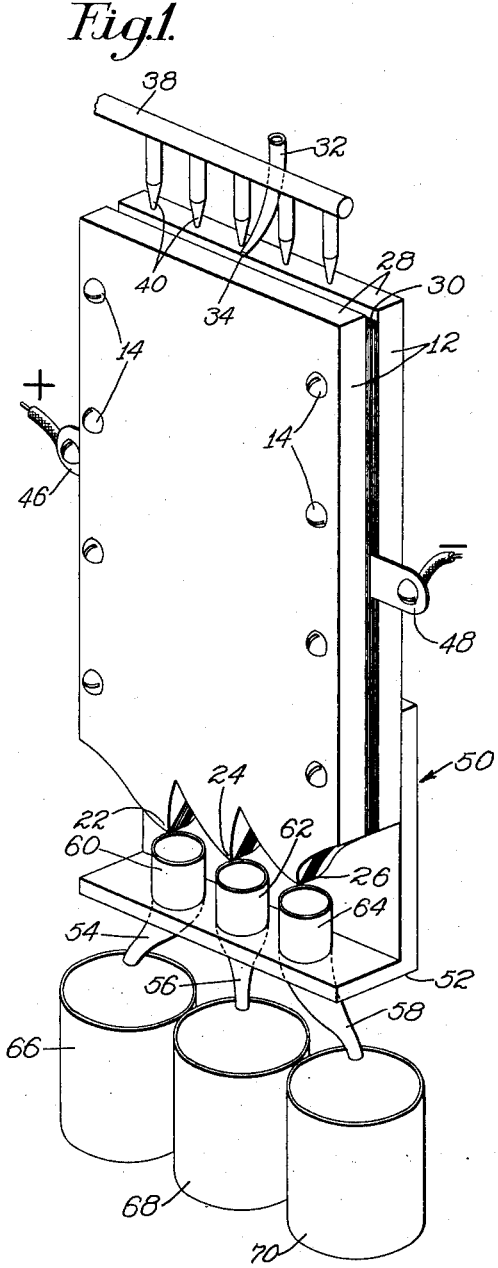
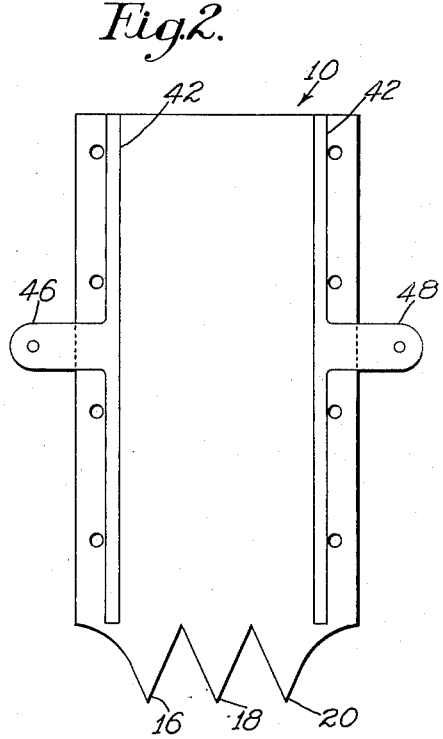
Inventors
Gotfred Haugaard
Thomas D Kroner
By their Attorney

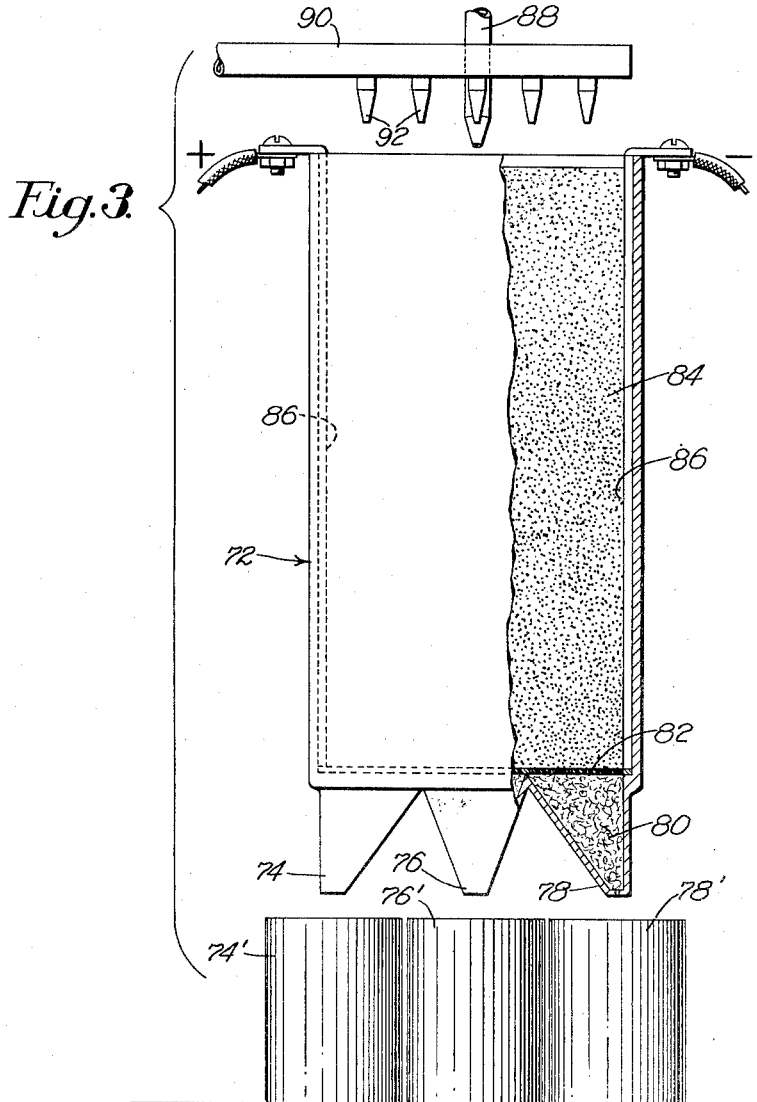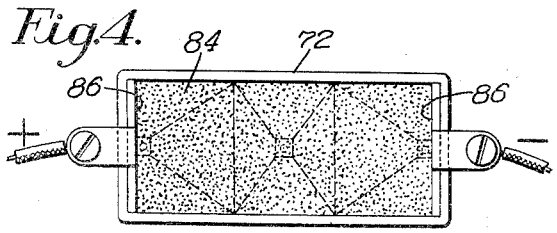

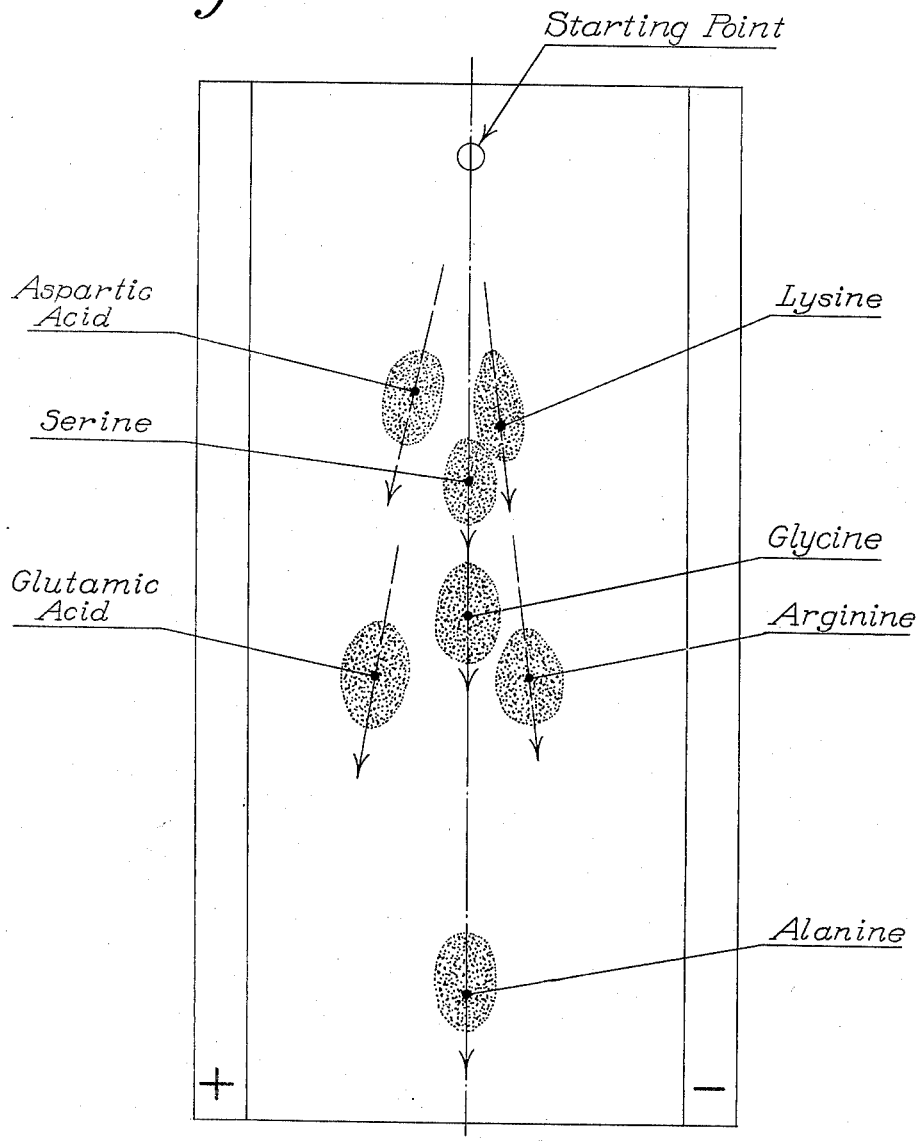

Patented June 5, 1951

2,555,487

UNITED STATES PATENT OFFICE 2,555,487

CHROMATOGRAPHIC PROCESS AND APPARATUS

Gotfred Haugaard, Oakdale, N. Y., and Thomas D. Kroner, Beverly, Mass., assignors to United Shoe Machinery Corporation, Flemington, N. J., a corporation of New Jersey Application February 27, 1948, Serial No. 11,715

11 Claims. (Cl. 204—180)

This invention relates to an improved method and apparatus for the chromatographic separation of substances.

Chromatographic separation involves flowing a solution of components to be separated or, where the components to be separated are present in the chromatographic column, a solvent for components to be separated, downwardly through a chromatographic column. Through interchange of components between the flowing liquid and the stationary chromatographic column, certain components are taken from the moving liquid in the upper portions of the column and other components are taken by lower portions of the column. The characteristic of the column of taking up components at various levels may depend upon a variety of characteristics. Where the chromatographic column comprises an adsorptive material, those components for which the adsorbent has the greatest affinity will be taken up by the higher portions of the column and will displace from the higher portions of the column components for which the adsorbent has the lesser affinity, the components displaced being adsorbed at a lower level in the column.

In a second kind of chromatographic column, a two-phase liquid system is employed. The solid body of the column, for example, paper or starch, is believed to act merely as a mechanical support to hold stationary one of these phases, the other phase moving down the column. Separation of the components is effected by difference in the partition coefficients of the materials in solution between the stationary body of liquid and the moving body of liquid. Those components having the higher coefficients will tend to transfer to the stationary body of liquid at higher points in the column than those components having lower coefficients.

As heretofore practiced, it sometimes happens that components which it is desired to separate chromatographically have adsorption affinities, or partition coefficients which are so nearly the same that a sharp separation by chromatographic means is impracticable.

It is a feature of the present invention to separate, by a simple method and apparatus, materials possessing characteristics which have heretofore rendered their chromatographic separation impracticable.

In accordance with the present invention, the pH of the body of liquid passing through the chromatographic column is adjusted to a value such that, of the components which it has heretofore been found impracticable to separate, certain components will carry a negative charge, i. e., will be acidic in the solution, certain other components will carry a positive charge, i. e., will be basic in the solution, and still other components will be substantially neutral in the solution. As the liquid is passed through the chromatographic column, an electrostatic field, that is, a stationary direct current electric field, is established between the electrodes in the column transverse to the direction of travel of the liquid. Under the influence of the electrostatic field, a transverse force is applied to the bodies moving through the chromatographic column so that substances carrying a negative charge in the liquid in the column are moved toward the side of the column having a positive electrode, substances carrying a positive charge are moved toward the side of the column having a negative electrode, and substances neutral in the liquid travel centrally of the chromatographic column.

The invention is explained more fully below in connection with its use in apparatus of the type shown in the drawings forming part of the present disclosure. In the drawings, Fig. 1 is a perspective of a chromatographic apparatus including a column comprising a plurality of sheets of filter paper clamped together to provide an absorbent mass;

Fig. 2 is a plan of a sheet of filter paper which may be used in the chromatographic apparatus of Fig. 1;

Fig. 3 shows a chromatographic apparatus including a column comprising a body of granular material;

Fig. 4 is a plan of the column shown in Fig. 3; and

Fig. 5 shows a developed chromatogram prepared in accordance with one aspect of the present invention.

The apparatus shown in Fig. 1 comprises a plurality of elongated strips 10 of filter paper held together in a compact body by the plates 12 and bolts 14, which extend through the strips 10 and plates 12. As shown in Fig. 2, the strips 10 have parallel sides and terminate at their lower edges in three points 16, 18 and 20. The plates 12, which are formed of a non-conducting inert material, e. g., a plastic, glass, wood, etc., are shown as similar in shape to the paper strips 10 and terminate in points 22, 24 and 26, coinciding respectively with points 16, 18 and 20. The upper edges 28 of the plate 12 extend somewhat above the upper edges 30 of the strips 10 to form a trough for introduction of fluids to the column. A conduit 32 is provided for introduction of a liquid containing components to be separated and is positioned with its discharge opening 34 above the center of the trough formed by the plates 12. A device for feeding solvent uniformly over the upper surface of the assembled strips 10 is provided and may comprise, as shown in Fig. 1, a feed conduit 38 from which a series of nozzles 40 are disposed with their discharge openings uniformly spaced along the upper edges 30 of the strips 10. Electrodes 42 comprising strips of metallic foil which may be platinum, nickel, copper, aluminum, or other material are disposed between the strips 10, adjacent the edges. It is found in practice that an electrode between each five strips of filter paper gives satisfactory operation. These electrodes 42 are electrically connected to terminals 46 and 48 which are connected to a source of electric power not shown. The assembled plates 12, strips of paper 10 and electrode members 42 and 44 are supported by a bracket 50 of plastic L-shaped in cross section, the base 52 of the L providing a support for discharge conduit members 54, 56 and 58 which are disposed beneath the points 22, 24 and 26 at the bottom of the assembly. As shown in Fig. 1, these discharge conduits 54, 56 and 58 are funnel shaped members projecting through and supported by the L-shaped bracket 50 with their enlarged upper ends 60, 62 and 64 disposed to catch liquids dropping from the points 22, 24 and 26 and to conduct those liquids to separate receptacles, 66, 68 and 70.

In the use of this apparatus for chromatographic separation, the filter paper strips 10 of the column may be treated with a buffer salt to establish the pH of the column at a value corresponding to the iso-electric point of that component of the mixture to be separated whose iso-electric value lies between the iso-electric values of other components of similar chromatographic properties from which it is to be separated. An electric voltage is applied across the electrodes. A suitable voltage may range from about 40 to about 100 volts, where the materials to be separated have characteristics similar to amino acids. Voltages in excess of 105 apparently tend to cause excessive electrolysis of the buffer salts present in the column and voltages below about 40 do not give the desired spread of the components. A quantity of the materials to be separated is fed through conduit 32 to the top of the column; and a liquid chromatographic medium is then supplied through nozzles 40 to the upper edges 30 of the strips 10 of the column.

The liquid must be such as to form with the column of material a two-phase system of which one phase is held substantially stationary by the column and the other moves down the column As an example, a suitable liquid is the water-containing phenol obtained by equilibrating water with phenol to form a two-phase system regarded as comprising a solution of water in phenol as one phase and a solution of phenol in water as the other phase. When the solution of water in phenol is brought in contact with filter paper, the water brought in contact with filter paper, the water present in undefined condition in the filter paper acts as a stationary phase to which components to be separated transfer from the moving phenol phase. Another suitable liquid capable of forming a two-phase system with filter paper is butanol equilibrated with water. Other systems are known and may be used. The action of the liquid causes the components to be separated to move down through the column at differing rates; and the action of the electrostatic field imparts to the acidic or basic components a movement transverse to the direction of travel of the liquid lengthwise of the column. The flow of solvent through the column may be interrupted after separation of the components has been effected by chromatographic action with the formation of separate bands or enriched portions at spaced intervals lengthwise of the column, or may be continued until the desired component or components have been carried by the solvent to the base of the column and discharged from the points at the bottom of the column. Where flow of solvent is terminated as soon as separation into bodies lengthwise of the column is achieved the desired fraction may be obtained by developing the chromatogrpahic deposits according to known procedure and mechanically dividing the column into sections containing the desired components. Where flow of solvents is continued until the desired components are washed from the column, desired components may be obtained by collecting from the points 22, 24 and 26 fractions of the solvent at determined time intervals so that components carried through at an early stage are collected separately from those carried through at a later stage. In either case the action of the electrostatic field will direct the more basic components toward the negative electrode and the more acid components toward the positive electrode, but will not affect the neutral components so that components in the same section of the column, considered heightwise, will be laterally separated and may be recovered in relatively pure state.

The chromatographic column shown in Figs. 3 and 4 comprises a chamber 72 terminating at its bottom in three outlets 74, 76 and 78, two of which 74 and 78 are disposed on opposite sides of the bottom of the chamber 72 and the third 76 of which is disposed in the center at the bottom of the chamber 72. These outlets 74, 76 and 78 are roughly conical in cross section and are filled with a porous packing 80 such as glass wool to a level corresponding to the upper edges of the conical portions. A porous plate 82 is disposed above the glass wool to form a level bottom for the column of chromatographic material 84 within the chamber 72. Receptacles $74^1$, $76^1$ and $78^1$ are provided to collect liquid from outlets 74, 76 and 78 respectively. Electrodes 86 are disposed at opposite sides within the chamber 72 corresponding to the sides of the chamber on which the outlets 74 and 78 are positioned. For two-phase chromatography, the chromatographic material 84 in the chamber 72 may be starch or comparable absorbent material which may be saturated with a solution of a buffer salt at a pH determined as in the process using the filter paper type of column.

A conduit 88 is disposed above the center of the upper surface of the chromatographic material in position to discharge into the material 84 a solution of the components to be separated. A manifold 90 from which lead evenly spaced nozzles 92 is disposed above the body of material in the column in position to discharge liquid uniformly to the top of the material 84 within the chamber 72.

The mode of operation of this column is similar to that of the filter paper column. A quantity of the material to be separated into its components is introduced at the top of the column; and solvent, having the determined pH, is passed down through the column and an electrostatic field is applied to the electrodes to effect the desired separation. With this column as with the filter paper column, the components may be recovered by passing solvent through the column and recovering desired fractions at determined time intervals from the three outlets 74, 76 and 78 at the base of the column, or the chromatographic column may be developed and the separate fractions recovered by mechanical division of the column.

In the separation of materials by use of adsorption chromatography, the tower employed is similar to that used in connection with the starch-filled absorption chromatographic column described above, but the interior of the chamber 72 is filled with an adsorbent material such as silica gel, adsorbent carbon or other known adsorbent. The body of adsorbent may be brought to the desired pH as in the preceding methods, and an electrostatic field is applied across the column by means of the electrodes 86. A solution of the components to be separated is then introduced into the top of the column and is separated into bands heightwise of the column by the chromatographic action of the column and is separated transversely of the column by the electrostatic field. When a separation into bands has been accomplished, the supply of solution to the column is cut off and a solvent for the components is flowed down through the column. Separate fractions containing desired components may be collected from the outlets at the bottom of the column as in the procedure described in connection with the absorption method above described. Alternatively, the column may be developed and the body of adsorbent mechanically separated into those components containing desired components.

The following examples are given to aid in understanding the invention and it is to be understood that the invention is not limited to the reagents or procedural details disclosed in the examples:

*Example I.*—A chromatographic column similar to that shown in Fig. 2 was prepared by dipping strips of filter paper in an M/15 phosphate buffer at pH 6.2, the iso-electric point of the neutral amino acids of the mixture to be separated. Excess liquid was removed by pressing the strips and the strips were air dried. The dried strips were then cut to a shape corresponding to the binding plates of the apparatus shown in Fig. 2, the size of the strips aside from the discharge points being 4″ wide by 8″ long. Forty of the strips were assembled between the binding plates with nickel ribbon electrode strips between every five sheets, the electrodes being spaced at a distance apart of about 3½″. The assembled column was then deposited in a bell jar at constant temperature to avoid difficulties due to evaporation at the edge and fluctuations in temperature which might affect the operation of the column. There were introduced at the top of the column 0.5 milliliter of a solution containing about 0.1 mg. per milliliter calculated on the basis of amino nitrogen of each of the following amino acids:

Lysine
Aspartic acid
Serine
Glycine
Glutamic acid
Arginine
Alanine

Phenol equilibrated with water was then fed uniformly to the top of the column at a rate which caused movement of the phenol down the column at the rate of about one inch per hour. A voltage of 100 v. was applied across the electrodes. The liquid dropping from the discharging points at the bottom of the column was collected in separate containers, different containers being disposed to collect the different discharges. The solution collected was removed and analyzed at one-half-hour intervals during the chromatographic operation. The solution from the central discharge point from the 21st hour to the 24th hour contained alanine. The solution collected in the receptacle adjacent the negative electrode between 34 hours and 38½ hours contained arginine, while the solution collected during the same period in the receptacle adjacent the positive electrode contained glutamic acid. The solution collected from the central discharge point between 37 and 44½ hours contained glycine. The solution collected in the receptacle below the central discharge point between 52½ and 64½ hours contained serine. The solution collected in the receptacle adjacent the negative electrode from 68 to 88½ hours contained lysine; and the solution collected in the receptacle adjacent the positive electrode from 57½ to 82 hours contained aspartic acid.

*Example II.*—A single sheet of filter paper approximately 18″ long was dipped in M/15 phosphate buffer at a pH 6.2 which is the iso-electric point of the neutral amino acids of the mixture to be separated. Excess fluid was removed by pressing and the strip was air dried. Nickel ribbon electrodes were secured to the edges of the paper at a spacing of 3½″. The center of the top of the strip was inoculated with 15 cubic millimeters of a solution of a mixture of amino acids consisting of two di-carboxylic acids, aspartic acid and glutamic acid; two basic acids, lysine and arginine; and three neutral amino acids, serine, glycine, and alanine. The concentration of the individual amino acids in the mixture was 0.1 mg. per milliliter calculated on the basis of amino nitrogen. Phenol equilibrated with water was then fed uniformly to the top of the column at a rate which caused movement of the phenol down the column at the rate of about 1 inch an hour and a voltage of 105 v. was applied across the electrodes. The filter paper was inclosed in a bell jar to avoid evaporation, and temperature was maintained constant to avoid temperature change effects. At the end of 18 hours the supply of equilibrated phenol and the voltage were cut off and the chromatogram developed by the well-known ninhydrin reaction. The resulting chromatogram is shown in Fig. 5. As shown in the chromatogram, the amino acids lysine, aspartic acid and serine moved substantially the same distance down the column from the starting point. However, under the action of the electrostatic field, the asparatic acid, which has a negative charge in the solution, moved laterally toward the positive electrode. The lysine, on the other hand, which carried a positive charge in the solution moved laterally toward the negative electrode and the serine, which was substantially neutral in the solution moved downwardly in a straight line from the starting point. Glutamic acid which carries a negative charge in the solution is moved laterally under the action of the electrostatic field toward the positive electrode and moved more rapidly down the column than aspartic acid above referred to. Arginine carries a positive charge in the solution so that it is moved laterally toward the negative electrode. The arginine travels more rapidly down the column so that it is separated from the lysine. Lysine and alanine carry no charge in the solution and hence receive no lateral force from the electrostatic field; but due to differences in rates of travel down the filter paper due to chromatographic action, the bodies of these materials are separated from each other and from serine above referred to. The chromatogram (Fig. 5) demonstrates that action of the downward movement due to the flowing phenol and the sideward movement due to the electrostatic field determines the paths of the components.

When separation due to divergence of path is combined with separation due to downward movement of components, the resulting difference in position between components so separated is greater than would be the difference in position if only chromatographic action or electrostatic field action alone were involved. This may be important for the separation of two components. It will be observed from the chromatogram that the areas containing lysine and serine would overlap considered heightwise if the electrostatic field were not applied and would overlap endwise if the chromatographic action were not applied. Thus the novel combined action obtained by applicants accomplishes results not obtainable by chromatographic or electrostatic separation severally.

Having thus described our invention, what we claim as new and desire to secure by Letters Patent of the United States is:

1. A method of separating components of a mixture including components having different iso-electric points which comprises passing a solution containing said components in contact with a chromatographic column, said solution having a pH such that at least one of said components has a difference in charge in said solution from another of said components and establishing an electrostatic field transversely of the movement of the solution to cause said component having a difference in charge to move relative to said other component transversely of the direction of movement of the solution.

2. A method of separating components of a mixture including components having different iso-electric points comprising passing a solution containing said components through a chromatographic column, said solution having a pH such that at least one of said components has a difference in charge in said solution from another of said components, establishing an electrostatic field transversely of the movement of the solution to cause said component having a difference in charge to move relative to said other component transversely of the direction of movement of the solution and terminating flow of said solution through the chromatographic column when different components have separated into distinct areas of said column.

3. A method of separating components of a mixture including components having different iso-electric points comprising passing a solution containing said components through a chromatographic column, said solution having a pH such that at least one of said components has a difference in charge in said solution from another of said components, establishing an electrostatic field transversely of the movement of the solution to cause said component having a difference in charge to move relative to said other component transversely of the direction of movement of the solution, terminating flow of said solution through the chromatographic column, passing solvent through said column to carry said components from the column, and separately collecting said components.

4. A method of separating components from a mixture including components which possess different iso-electric points and similar but not identical partition coefficients in a two-phase liquid solvent system which comprises introducing a quantity of said mixture into an absorption chromatographic column, wherein one phase of said liquid solvent system is held substantially stationary by said column, passing through said column a liquid solvent forming a second phase in equilibrium with said first phase in said two-phase system, said two-phase liquid solvent system having a pH differing from the iso-electric point of at least one of said components to be separated such that at least one of said components has a difference in charge in said solvent relative to other components, and establishing an electrostatic field transversely of the movement of the solution to cause said component having a difference in charge to move relative to said other components transversely of the direction of movement of the solution.

5. A method of separating components according to claim 4 wherein flow of solvent is continued until said components are carried from said column and the components are collected separately.

6. A method of separating amino acids from a solution of a mixture including amino acids which possess similar partition coefficients in a two-phase liquid solvent system, which comprises introducing a quantity of said solution into an absorption chromatographic column wherein one phase of said liquid solvent system is held substantially stationary by said column, passing through said column a liquid solvent forming a second phase in equilibrium with said first phase in said two-phase system, said two-phase liquid solvent system having a pH intermediate the iso-electric points of certain of said amino acids to be separated whereby said amino acids carry different charges in said solvent, and establishing an electrostatic field transversely of the movement of the solution to cause said amino acids carrying different charges to move transversely of the column.

7. A method of separating components which possess different iso-electric points and similar but not identical adsorption characteristics in an adsorption chromatographic column, which comprises passing a solution containing said components through an adsorption chromatographic column, said solution having a pH differing from the iso-electric point of at least one of said components such that at least one of said components has a difference in charge in the solution relative to another component, and establishing an electrostatic field transversely of the movement of the solution to cause said component having a difference in charge to move relative to said other component transversely of the moving body of solution.

8. A method of separating components according to claim 7 wherein flow of solution is terminated, solvent is passed through said column to carry said components from the column, and said components are collected separately.

9. Apparatus for chromatographic separation comprising a column of absorbent material, means to flow liquid through said column, electrodes positioned to establish an electrostatic field transverse to the path of liquid through the column and separate outlets constructed and arranged to discharge liquid to separate corresponding receivers, said outlets being disposed adjacent each of the electrodes and at a point intermediate the electrodes.

10. Apparatus for chromatographic adsorption comprising a column of adsorbent material, means to flow liquid through said column, electrodes positioned to establish an electrostatic field transverse to the path of liquid through the column and separate outlets constructed and arranged to discharge liquid to separate corresponding receivers, said outlets being disposed adjacent each of the electrodes and at a point intermediate the electrodes.

11. Apparatus for chromatographic separation comprising a chromatographic column, means to flow liquid through said chromatographic column, electrodes positioned to establish an electrostatic field transverse to the path of liquid through the column, and separate outlets constructed and arranged to discharge liquid from said column to separate corresponding receivers, one of said outlets being disposed closer to one of the electrodes than to the other electrode and another of said outlets being closer to said other electrode than to the first-mentioned electrode.

GOTFRED HAUGAARD.
THOMAS D. KRONER.

REFERENCES CITED

The following references are of record in the file of this patent:

UNITED STATES PATENTS

| Number | Name | Date |
| --- | --- | --- |
| 2,158,595 | Slagle | May 16, 1939 |
| 2,428,328 | Ham et al. | Sept. 30, 1947 |

OTHER REFERENCES

Strain: Journal American Chemical Society, vol. 61 (1939), pp. 1292–93.

Strain: Chromatographic Adsorption Analysis; 1942; pp. 28, 40, 41, 151, and 152.

Hodgman: Handbook of Chemistry and Physics, 27th ed. (1943), p. 1357.

Lecoq: Chemical Abstracts, vol. 42 (1948), p. 6703.